United States Patent Office 3,246,001
Patented Apr. 12, 1966

3,246,001
3,5-DICHLORO-2,6-DIMETHYL-4-PYRIDINOL
Raymond H. Rigterink, Midland, Mich., assignor to The Dow Chemical Company, Midland, Mich., a corporation of Delaware
No Drawing. Filed Sept. 25, 1963, Ser. No. 311,309
1 Claim. (Cl. 260—297)

The present invention is directed to 3,5-dichloro-2,6-dimethyl-4-pyridinol corresponding to the formula:

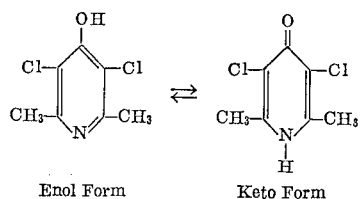

Enol Form     Keto Form

This compound is a crystalline solid material which is somewhat soluble in many common organic solvents and of very low solubility in water. The compound is useful as a parasiticide for the control of many mite, insect, bacterial and fungal organisms such as mites, flies, aphids, beetles and worms.

The new compound may be prepared by the chlorination of 2,6-dimethyl-4-pyridinol. The chlorination is carried out in a hydrogen halide acid and preferably in an aqueous solution of hydrochloric acid. Good results are obtained when the chlorination is carried out with any substantial amount of chlorine. However, it is usually preferred to convert the entire 2,6-dimethyl-4-pyridinol reactant. When operating in accordance with such preferred procedure, one molecular proportion of the 2,6-dimethyl-4-pyridinol is employed with at least two molecular proportions of chlorine. Larger or smaller amounts of chlorine can be employed but are undesirable from the standpoint of economy of operation. The reaction is carried out at a temperature at which hydrogen chloride is formed as a product of reaction and conveniently at temperatures of from 15° to 80° C. The chlorination takes place smoothly under the foregoing conditions with the production of the desired 3,5 - dichloro - 2,6 - dimethyl-4-pyridinol as a crystalline solid. Upon completion of the chlorination, the reaction mixture is filtered to separate the desired product which can be further purified by conventional procedures such as washing with water and recrystallization from various organic solvents.

In a representative operation, chlorine (1430 grams; 20.05 moles) was introduced portionwise into a mixture consisting of 1127 grams (9.15 moles) of 2,6-dimethyl-4-pyridinol, 915 milliliters of concentrated hydrochloric acid and 9150 milliliters of water. The addition was carried out over a period of 12.5 hours and at a temperature of 25° C. Following the chlorination, the reaction mixture was filtered to separate the 3,5-dichloro-2,6-dimethyl-4-pyridinol product in a yield of 82 percent. This product was a white crystalline solid which failed to melt at temperatures up to 350° C. The product was recrystallized from dimethylformamide and had a nitrogen content of 7.59 percent and a chlorine content of 36.74 percent as compared to a theoretical content of 7.29 percent for nitrogen and 36.74 percent for chlorine.

The compound of the present invention is useful as a parasiticide for the control of a number of parasite species. For such use, this product is dispersed on a finely divided solid and employed in the form of a dust. Also, such mixtures may be dispersed in water with or without the aid of a surface active dispersing agent and the resulting aqueous suspensions employed as sprays. In other procedures, the product is employed as a constituent in solvent solutions, water-in-oil or oil-in-water emulsions or aqueous dispersions. In representative operations, aqueous compositions containing 2,000 parts per million by weight of 3,5 - dichloro - 2,6-dimethyl-4-pyridinol give substantially complete kills of southern army worms.

The 2,6-dimethyl-4-pyridinol (enol and keto forms) employed as a starting material in accordance with the foregoing teachings is prepared in known procedures from 2-acetyl-3-oxo-4-hexenoic acid, Δ-lactone. In such method, the 2-acetyl-3-oxo-4-hexenoic acid, Δ-lactone is decarboxylated by treatment with hydrochloric acid at about 100° C. to obtain the 2,6-dimethyl-4H-pyran-4-one. This reaction mechanism is represented by the following:

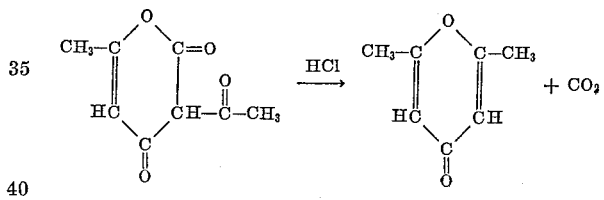

Ammonolysis or treatment of the 2,6-dimethyl-4H-pyran-4-one with aqueous ammonia gives the 2,6-dimethyl-4-pyridinol in excellent yield.

What is claimed is:
3,5-dichloro-2,6-dimethyl-4-pyridinol.

References Cited by the Examiner

Klingsberg: "Pyridine and Its Derivatives," part 3, pp. 790–92, 872, 886 (Interscience) (1962).

WALTER A. MODANCE, *Primary Examiner.*
ROBERT T. BOND, *Assistant Examiner.*